United States Patent
Liao et al.

(10) Patent No.: US 10,470,044 B2
(45) Date of Patent: Nov. 5, 2019

(54) RESOLVING BIDDING DOWN ATTACKS FOR MULTI-CONNECTIVITY

(71) Applicant: Intel Corporation, Santa Clara, CA (US)

(72) Inventors: Ching-Yu Liao, Portland, OR (US); Abhijeet Ashok Kolekar, Hillsboro, OR (US); Farid Adrangi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/245,837

(22) Filed: Jan. 11, 2019

(65) Prior Publication Data

US 2019/0149997 A1 May 16, 2019

Related U.S. Application Data

(60) Provisional application No. 62/616,841, filed on Jan. 12, 2018.

(51) Int. Cl.
| | |
|---|---|
| *H04W 12/12* | (2009.01) |
| *H04W 76/15* | (2018.01) |
| *H04W 24/10* | (2009.01) |
| *H04W 12/04* | (2009.01) |
| *H04W 76/27* | (2018.01) |

(52) U.S. Cl.
CPC ... *H04W 12/1202* (2019.01); *H04W 12/0403* (2019.01); *H04W 24/10* (2013.01); *H04W 76/15* (2018.02); *H04W 76/27* (2018.02)

(58) Field of Classification Search
CPC ........ H04W 12/1202; H04W 12/0403; H04W 76/15; H04W 76/27; H04W 24/10

USPC ......................................................... 455/411
See application file for complete search history.

(56) References Cited

U.S. PATENT DOCUMENTS

| | | | | |
|---|---|---|---|---|
| 2015/0208235 A1* | 7/2015 | Ingale | .................. | H04W 12/04 455/411 |
| 2015/0351139 A1* | 12/2015 | Zhang | ............... | H04W 52/0251 370/329 |
| 2016/0029213 A1* | 1/2016 | Rajadurai | ............. | H04W 12/04 380/283 |

OTHER PUBLICATIONS

3GPP TS 33.401 V15.2.0 (Jan. 2018) (Year: 2018).*
3GPP TS 33.501 V15.1.0 (Jun. 2018) (Year: 2018).*

* cited by examiner

*Primary Examiner* — William Nealon
(74) *Attorney, Agent, or Firm* — Schwegman Lundberg & Woessner, P.A.

(57) ABSTRACT

User equipment (UE) within dual connectivity (DC) architecture with a Master Node-B (MN) and a Secondary Node-B (SN) includes processing circuitry decoding connection reconfiguration information from the MN. The connection reconfiguration information includes signaling radio bearer type 3 (SRB3) configuration information. The SRB3 configuration information originates from the SN and configures a SRB3, the SRB3 for a radio resource control (RRC) connection between the UE and the SN. An RRC connection reconfiguration request message received from the SN via the SRB3 is decoded. The RRC connection reconfiguration request message includes UE new radio (NR) security capability information of the SN. The processing circuitry further determines whether the UE NR security capability information received from the SN matches UE NR security capability information received by the UE from the MN.

20 Claims, 13 Drawing Sheets

RESOLVING BIDDING DOWN ATTACKS FOR MULTI-CONNECTIVITY

PRIORITY CLAIM

This application claims the benefit of priority to the U.S. Provisional Patent Application Ser. No. 62/616,841, filed Jan. 12, 2018, and entitled "METHOD AND APPARATUS OF RESOLVING BIDDING DOWN ATTACKS FOR MULTI-CONNECTIVITY," which patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for resolving bidding down attacks for multi-connectivity network architectures, such as dual connectivity (DC) network architectures.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to address resolving bidding down attacks for multi-connectivity.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
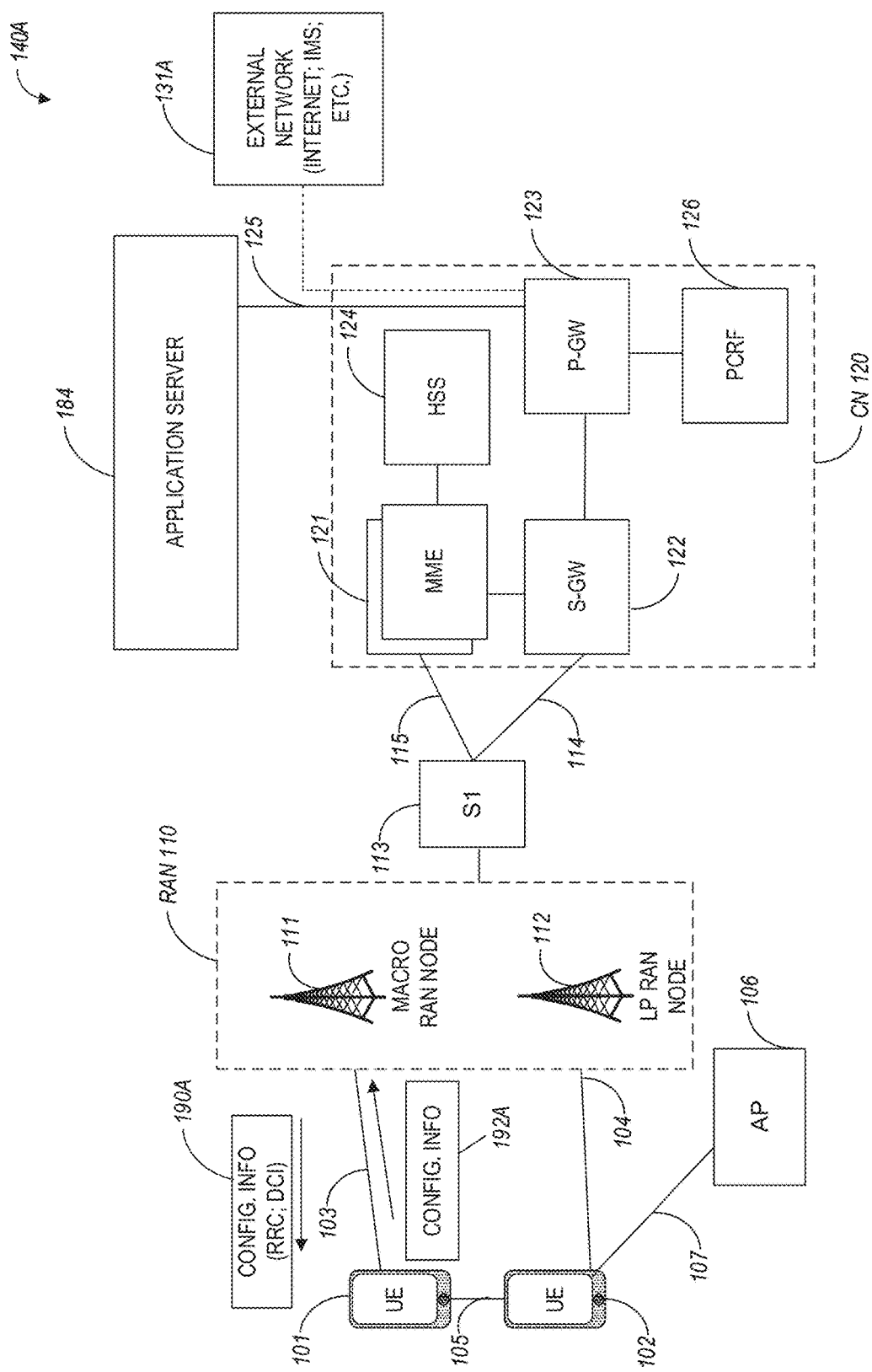
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touch-screen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) wherein particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, and FIG. 1D.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can operate in dual connectivity (DC) configuration with a master node (MN) and a secondary node (SN). The UE 101 can receive configuration information 190A (from MN or SN) via, e.g., higher layer signaling or other types of signaling. The configuration information 190A can include an indication for renegotiation of UE NR security capability, which can be used for activation of encryption/decryption and integrity protection of user plane traffic with the SN and control plane signaling traffic with the MN or the SN. In some aspects, the configuration information 190A can be communicated directly by the SN via signaling radio bearer type 3 (SRB3) connection. In some aspects, configuration information 192A can be communicated from the UE 101 to the SN or the MN for purposes of activation of encryption/decryption and integrity protection of user plane and control plane communications. For example, configuration information 192A can include UE NR-DC token which can be used in secure key derivation for protecting the user plane and control plane communications.

Figure 1B:
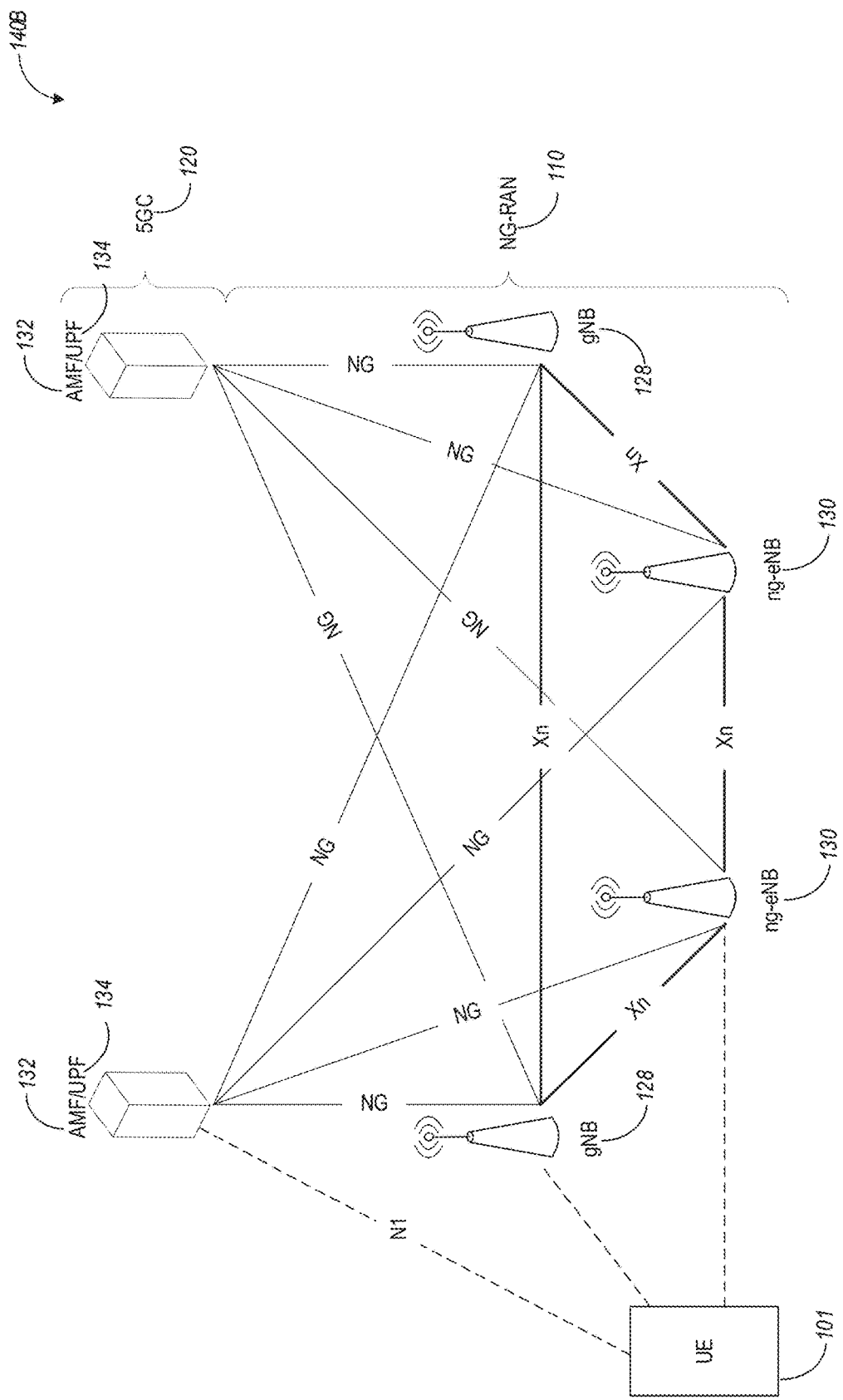
FIG. 1B is a simplified diagram of an overall next generation (NG) system architecture, in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, the NG system architecture 140B can use reference points between various nodes as provided by 3GPP Technical Specification (TS) 23.501 (e.g., V15.4.0, 2018-12).

In some aspects, each of the gNBs 128 and the NG-eNBs 130 can be implemented as a base station, a mobile edge server, a small cell, a home eNB, and so forth.

In some aspects, node 128 can be a master node (MN) and node 130 can be a secondary node (SN) in a 5G architecture. The MN 128 can be connected to the AMF 132 via an NG-C interface and to the SN 128 via an XN-C interface. The MN 128 can be connected to the UPF 134 via an NG-U interface and to the SN 128 via an XN-U interface.

Figure 1C:
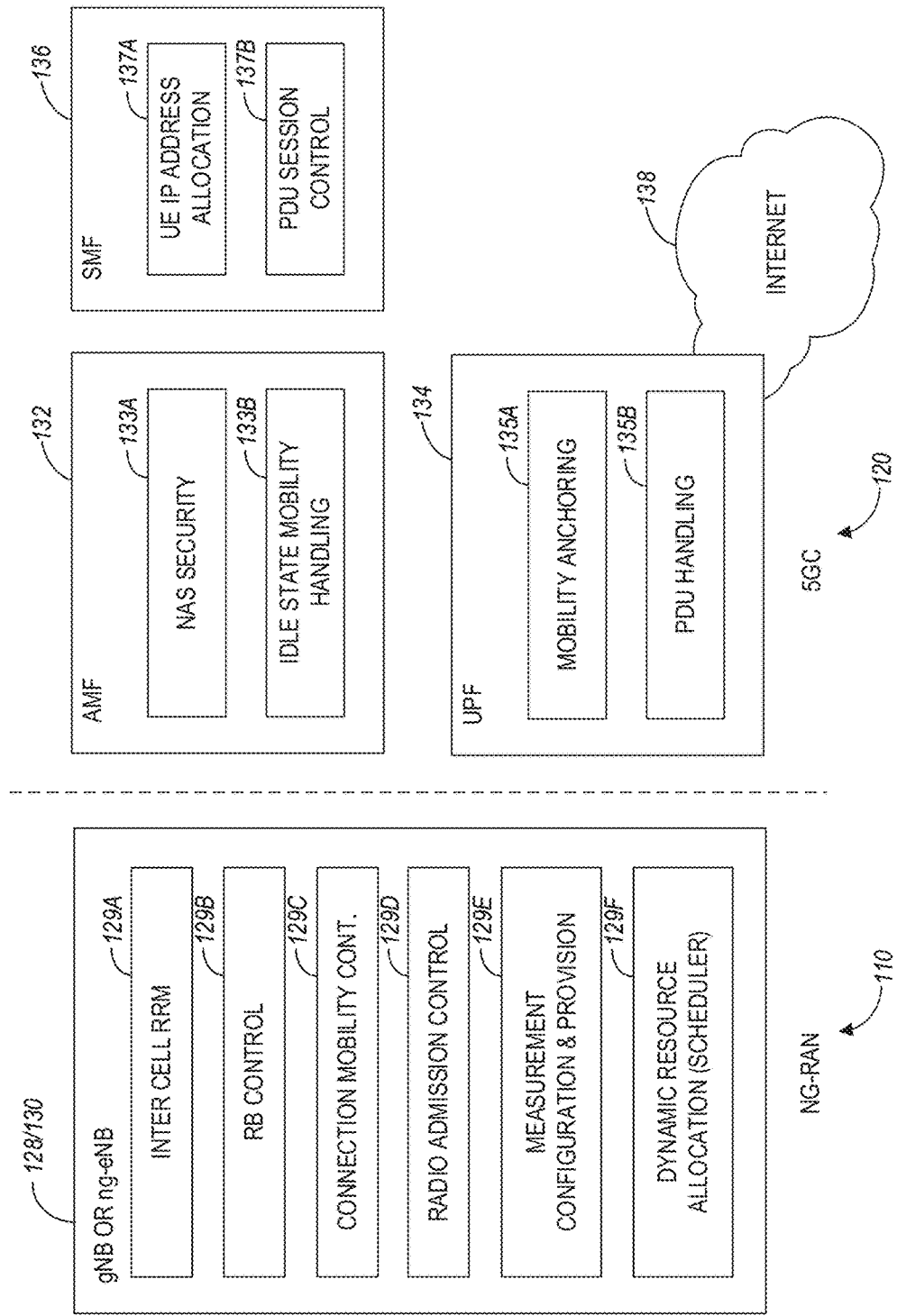
FIG. 1C illustrates a functional split between next generation radio access network (NG-RAN) and the 5G Core network (5GC), in accordance with some aspects.

FIG. 1C illustrates a functional split between NG-RAN and the 5G Core (5GC) in accordance with some aspects. Referring to FIG. 1C, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1D:
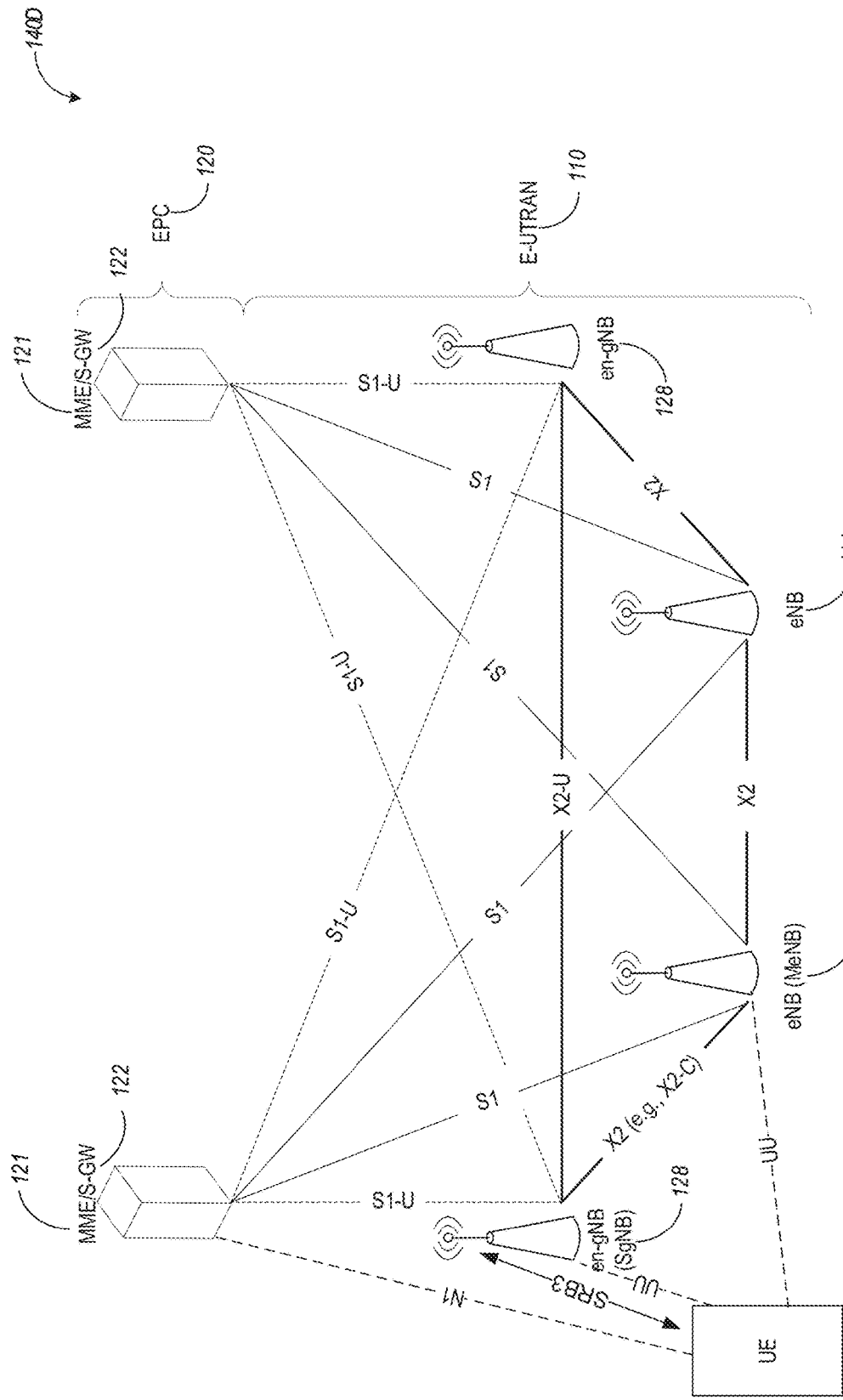
FIG. 1D illustrates an example Evolved Universal Terrestrial Radio Access (E-UTRA) New Radio Dual Connectivity (EN-DC) architecture, in accordance with some aspects.

FIG. 1D illustrates an example Evolved Universal Terrestrial Radio Access (E-UTRA) New Radio Dual Connectivity (EN-DC) architecture, in accordance with some aspects. Referring to FIG. 1D, the EN-DC architecture 140D includes radio access network (or E-TRA network, or E-TRAN) 110 and EPC 120. The EPC 120 can include MMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102 and acting as Secondary Nodes (or SgNBs) in the EN-DC communication architecture 140D. The eNBs 111 can be configured as master nodes (or MeNBs) and the eNBs 128 can be configured as secondary nodes (or SgNBs) in the EN-DC communication architecture 140D. As illustrated in FIG. 1D, the eNBs 111 are connected to the EPC 120 via the S1 interface and to the EN-gNBs 128 via the X2 interface. The EN-gNBs (or SgNBs) 128 may be connected to the EPC 120 via the S1-U interface, and to other EN-gNBs via the X2-U interface. The SgNB 128 can communicate with the UE 102 via a UU interface (e.g., using signaling radio bearer type 3, or SRB3 communications as illustrated in FIG. 1D), and with the MeNB 111 via an X2 interface (e.g., X2-C interface). The MeNB 111 can communicate with the UE 102 via a UU interface.

Even though FIG. 1D is described in connection with EN-DC communication environment, other types of dual connectivity communication architectures (e.g., when the UE 102 is connected to a master node and a secondary node) can also use the techniques disclosed herein.

In some aspects, the MeNB 111 can be connected to the MME 121 via S1-MME interface and to the SgNB 128 via an X2-C interface. In some aspects, the MeNB 111 can be connected to the SGW 122 via S1-U interface and to the SgNB 128 via an X2-U interface.

In some aspects associated with dual connectivity (DC) and/or MultiRate-DC (MR-DC), the Master eNB (MeNB) can offload user plane traffic to the Secondary gNB (SgNB) via split bearer or SCG (Secondary Cell Group) split bearer. In DC or MR-DC architectures, the MeNB hosts the packet data convergence protocol (PDCP) stack and generates the S-KgNB secure key for the secondary eNB (e.g., the SgNB). The S-KgNB key is communicated to the SgNB over the X2-C interface. The UE and the SgNB can derive additional secure keys such as the KUPint (for integrity protecting user plane traffic) and KUPenc (for encrypting user plane traffic) from the S-KgNB.

However, DC communication architectures may be vulnerable to a potential man-in-the-middle attack (MITM) because the MeNB terminates S1-C interface with the MME and manages RRC connection with the UE. In this regard, if the Master eNB is compromised, the UE may suffer bidding down issues cause by a compromised S-KgNB key and/or reduced/downgraded UE security capabilities that can be communicated from the MeNB to the SeNB. These security vulnerabilities can occur with the following dual connectivity communication cases: communication between the eNBs in an Evolved Packet System (EPS), communication between gNBs in a 5G system (5GS), and communication between an eNB and gNBs in EPS to 5GS migration support.

Figure 2A:
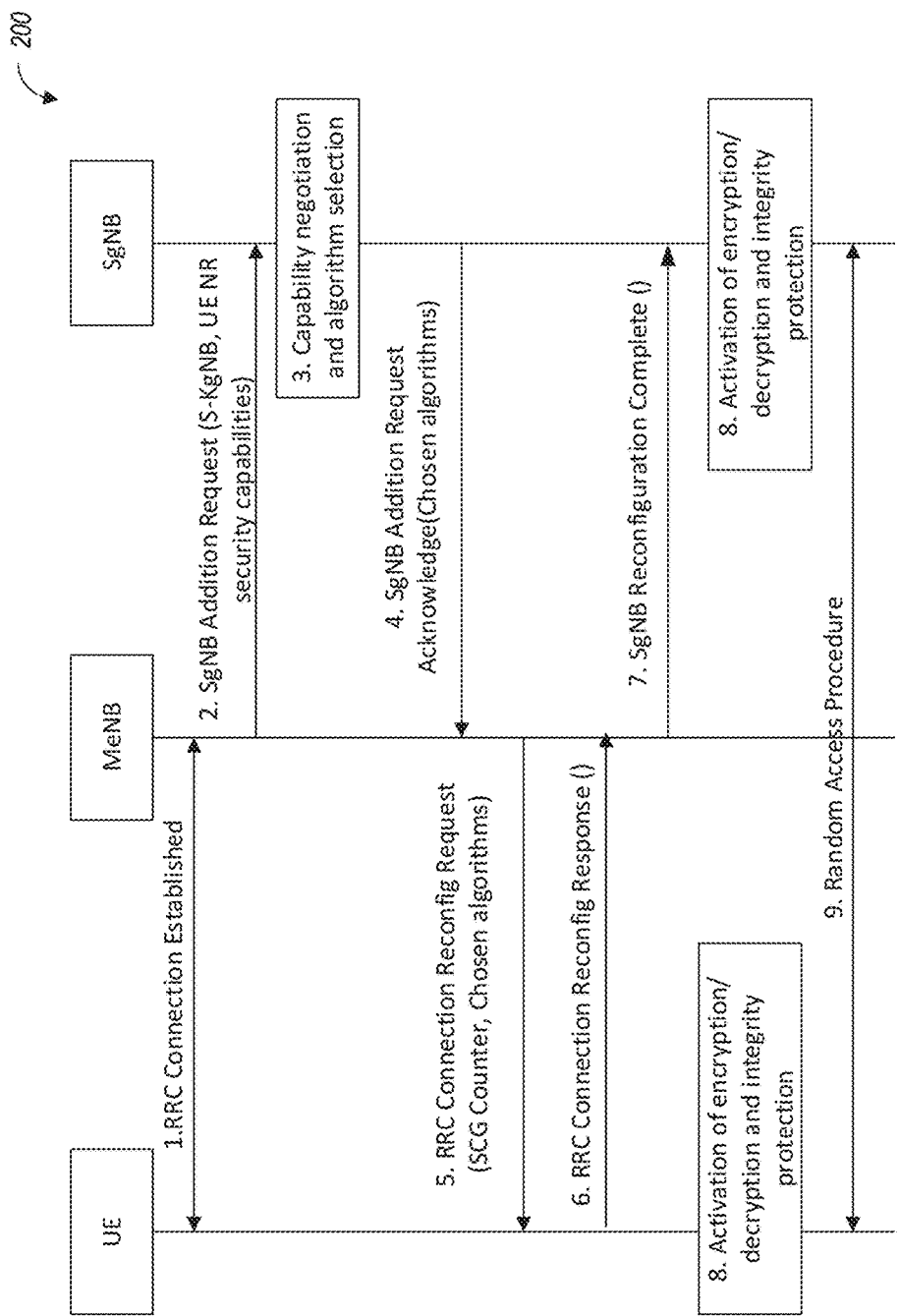
FIG. 2A illustrates SgNB encryption/decryption and integrity protection activation, in accordance with some aspects.

FIG. 2A illustrates SgNB encryption/decryption and integrity protection activation, in accordance with some aspects. Referring to FIG. 2A, the communication exchange 200 can take place between UE 101, MeNB 111, and SgNB 128.

When establishing one or more data radio bearers (DRBs) and/or a signaling radio bearer (SRB) for a UE at the SgNB, the MeNB forwards the UE NR security capabilities associated with the UE in the SgNB Addition/Modification procedure. Upon receipt of this message, the SgNB identifies the needed algorithm(s) with the highest priority in the locally configured priority list of algorithms that is also present in the received UE NR security capabilities and includes an indicator for the locally identified algorithm(s) in SgNB Addition/Modification Request Acknowledge message. The MeNB forwards the indication to the UE during the RRCConnectionReconfiguration procedure that establishes the SCG DRBs and/or SRB in the UE. The UE uses the indicated encryption algorithms for the SCG DRBs and/or SRB and the indicated integrity algorithm for the SRB. A more detailed description of operations 1-7 of communication exchange 200 is provided hereinbelow.

At operation 1, the UE and the MeNB can establish an RRC connection. At operation 2, the MeNB can check whether the UE has NR capability and is authorized to access NR. In this regard, the MeNB sends the SgNB an addition request message over the X2-C interface to negotiate the available resources, configuration, and algorithms at the SgNB. When connected to EPC, the MeNB can indicate to the SgNB that user plane (UP) integrity protection shall not be activated. The MeNB can compute and deliver the S-KgNB key to the SgNB if a new key is needed. The UE NR security capabilities are also sent to the SgNB in operation 2.

At operation 3, the SgNB allocates the necessary resources and selects the ciphering algorithm for the data radio bearers (DRBs) and a signaling radio bearer (SRB) used during dual connectivity communications and selects and integrity algorithm if an SRB is to be established which is the highest priority from his configured list and is also present in the UE NR security capabilities. If a new S-KgNB was delivered to the SgNB, then the SgNB calculates additional keys for use by the SgNB to encrypt or integrity protect user plane and control plane communications.

At operation 4, the SgNB sends the MeNB an addition request acknowledge message indicating the availability of requested resources and the identifiers for the selected algorithms to serve the requested DRBs and/or SRB for the UE.

At operation 5, the MeNB sends an RRC connection reconfiguration request message to the UE, instructing the UE to configure the new DRBs and/or SRBs for the SgNB. The MeNB can include the SCG counter parameter to indicate that the UE computes the S-KgNB for the SgNB if a new key is needed. The MeNB forwards the UE configuration parameters, which can include the algorithm identifiers received from the SgNB in operation 4. The communication between the MeNB and the UE during this operation can be integrity protected using an RRC integrity protection key of the MeNB.

At operation 6, the UE can accept the RRC connection reconfiguration command, and the UE computes the S-KgNB for the SgNB if an SCG counter parameter was included. The UE can also compute one or more of user plane and control plane encryption and integrity protection keys for the associated assigned to DRBs and/or SRB. The UE can then send the RRC connection reconfiguration complete message to the MeNB, and the UE activates the selected encryption/decryption and integrity protection (in operation 8).

At operation 7, the MeNB sends the SgNB reconfiguration complete message over the X2-C interface to inform the SgNB of the configuration result. After receipt of this message, the SgNB may activate (in operation 8) the selected encryption/decryption and integrity protection with the UE. If the SgNB does not activate encryption/decryption and integrity protection, the SgNB can activate encryption/decryption and integrity protection upon receiving the random access request from the UE during the initial stage of the random access procedure (operation 9).

Figure 2B:
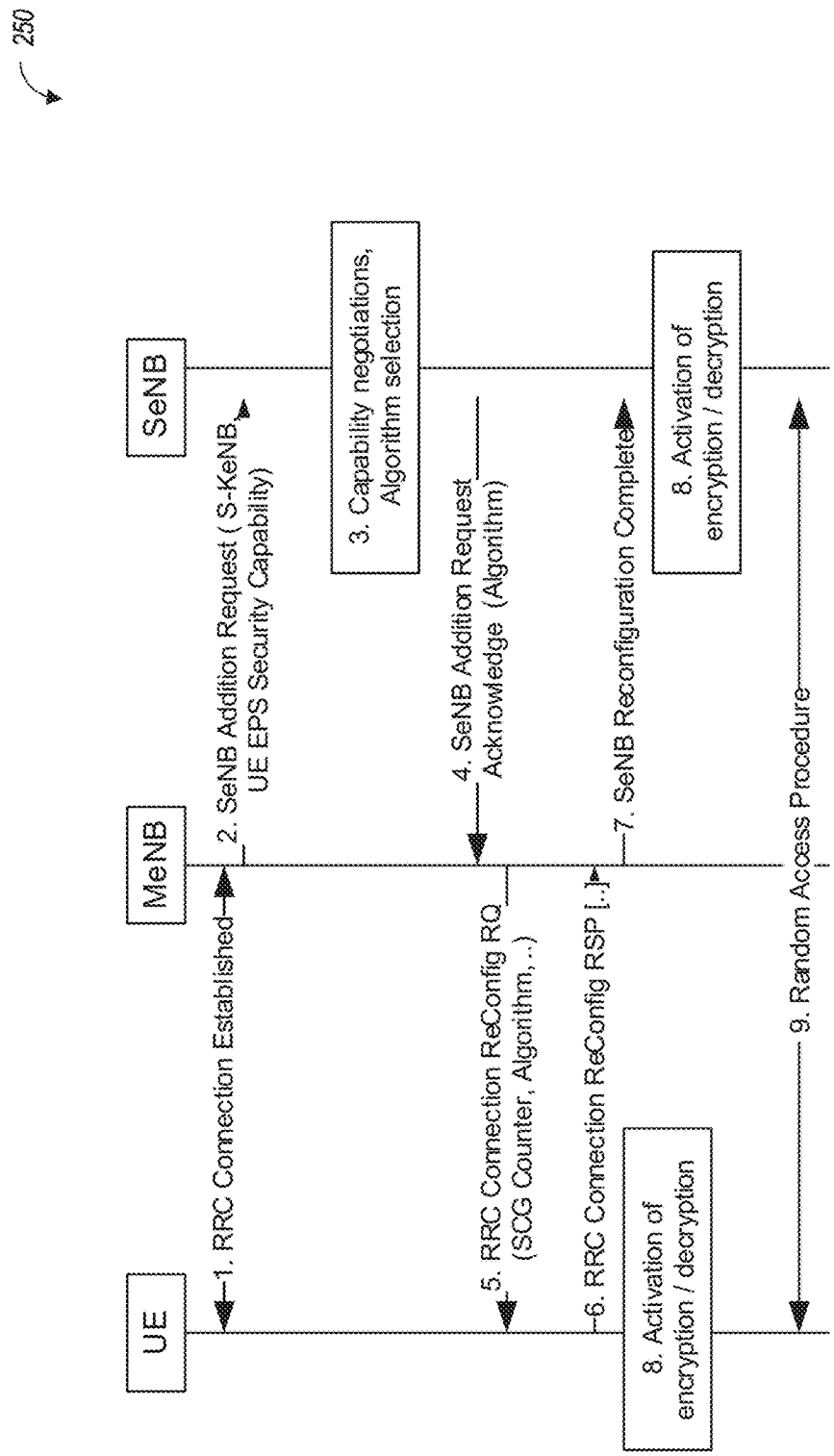
FIG. 2B illustrates SeNB encryption/decryption activation, in accordance with some aspects.

FIG. 2B illustrates SeNB encryption/decryption activation, in accordance with some aspects. In some aspects in connection with FIG. 1D, node 128 can be a secondary eNB node (or SeNB). Referring to FIG. 2B, the communication exchange 250 can take place between UE 101, MeNB 111, and SeNB 128.

At operation 1, the UE and the MeNB can establish an RRC connection. At operation 2, the MeNB can decide to offload the DRBs to the SeNB. The MeNB sends the SeNB an addition request message over the X2-C interface to negotiate the available resources, configuration, and algorithms at the SeNB. The MeNB computes and delivers the S-KeNB key to the SeNB if a new key is needed. The UE EPS security capabilities are also sent to the SeNB in operation 2.

At operation 3, the SeNB allocates the necessary resources and selects the ciphering algorithm which has the highest priority from its configured list and is also present in the UE EPS security capability. If a new S-KeNB was delivered to the SeNB, then the SeNB calculates additional keys for use by the SeNB to encrypt or integrity protect user plane and control plane communications.

At operation 4, the SeNB sends the MeNB an addition request acknowledge message indicating the availability of requested resources and the identifiers for the selected algorithms to serve the requested DRBs and/or SRB for the UE.

At operation 5, the MeNB sends an RRC connection reconfiguration request message to the UE, instructing the UE to configure the new DRBs and/or to SRB for the SeNB. The MeNB can include the SCG counter parameter to indicate that the UE computes the S-KeNB for the SeNB if a new key is needed. The MeNB forwards the UE configuration parameters, which can include the algorithm identifiers received from the SeNB in operation 4. The communication between the MeNB and the UE during this operation can be integrity protected using an RRC integrity protection key of the MeNB.

At operation 6, the UE can accept the RRC connection reconfiguration command, and the UE computes the S-KeNB for the SeNB if an SCG counter parameter was included. The UE can also compute one or more of user plane and control plane encryption and integrity protection keys for the associated assigned to DRBs and/or SRB. The UE can then send the RRC connection reconfiguration complete message to the MeNB, and the UE activates the selected encryption/decryption.

At operation 7, the MeNB sends the SeNB reconfiguration complete message over the X2-C interface to inform the SeNB of the configuration result. After receipt of this message, the SeNB may activate the selected encryption/decryption with the UE. If the SeNB does not activate encryption/decryption, the SeNB can activate encryption/decryption upon receiving the random access request from the UE during the initial stage of the random access procedure.

In some aspects, the bidding down issue occurs when the MeNB/MgNB is compromised and the UE's EPS/NR security capabilities may be potentially downgraded or tampered with. Techniques disclosed herein can be used to resolve the above-mentioned MITM attack with potential bidding down issue when activating dual connectivity for the UE.

In some aspects, one or more of the following assumptions can be made when applying the techniques disclosed herein: (a) the UE has provided its NR security capabilities to the EPC/5GC in attach procedure (or a registration procedure), and the MeNB/MgNB receives the UE NR security capabilities; (2) the MeNB/MgNB has successfully added SgNB for DC and the UE has enabled the DC; (3) the SgNB and the UE have activated encryption/decryption and integrity protection; (4) the SgNB has configured SRB3 for exchanging RRC messages with the UE without MN involvement; and (5) even though techniques disclosed herein use EN-DC communication architectures as examples, the disclosed techniques can be applicable to any DC scenarios between MeNB/MgNB and SeNB/SgNB.

Figure 3:
FIG. 3 illustrates SN-initiated SN modification without MN involvement, in accordance with some aspects.

FIG. 3 illustrates SN-initiated SN modification without MN involvement, in accordance with some aspects. In some aspects as illustrated in FIG. 1D, a secondary RAN node (SN) (e.g., SgNB 128) may decide to establish SRB3, which provides the SRB3 configuration using an SN RRC message. The SRB3 may be used between the UE and the SgNB for communicating SN RRC Reconfiguration, SN RRC Reconfiguration Complete, and SN Measurement Report messages in procedures where the MN is not involved (i.e., no MN RRC messages are mapped to SRB3).

Referring to FIG. 3, the communication exchange 300 can occur between the UE and the SgNB when SRB3 is established. More specifically, with established SRB3, the SN can perform SN initiated SN Modification without MN involvement, by sending RRC connection messages to the UE and receiving RRC connection complete messages from the UE without the MN involvement. In some aspects, direct communication between the UE and the SgNB using established SRB3 can be used in connection with techniques disclosed herein for resolving bidding down attacks in multi-connectivity scenarios.

Figure 4:
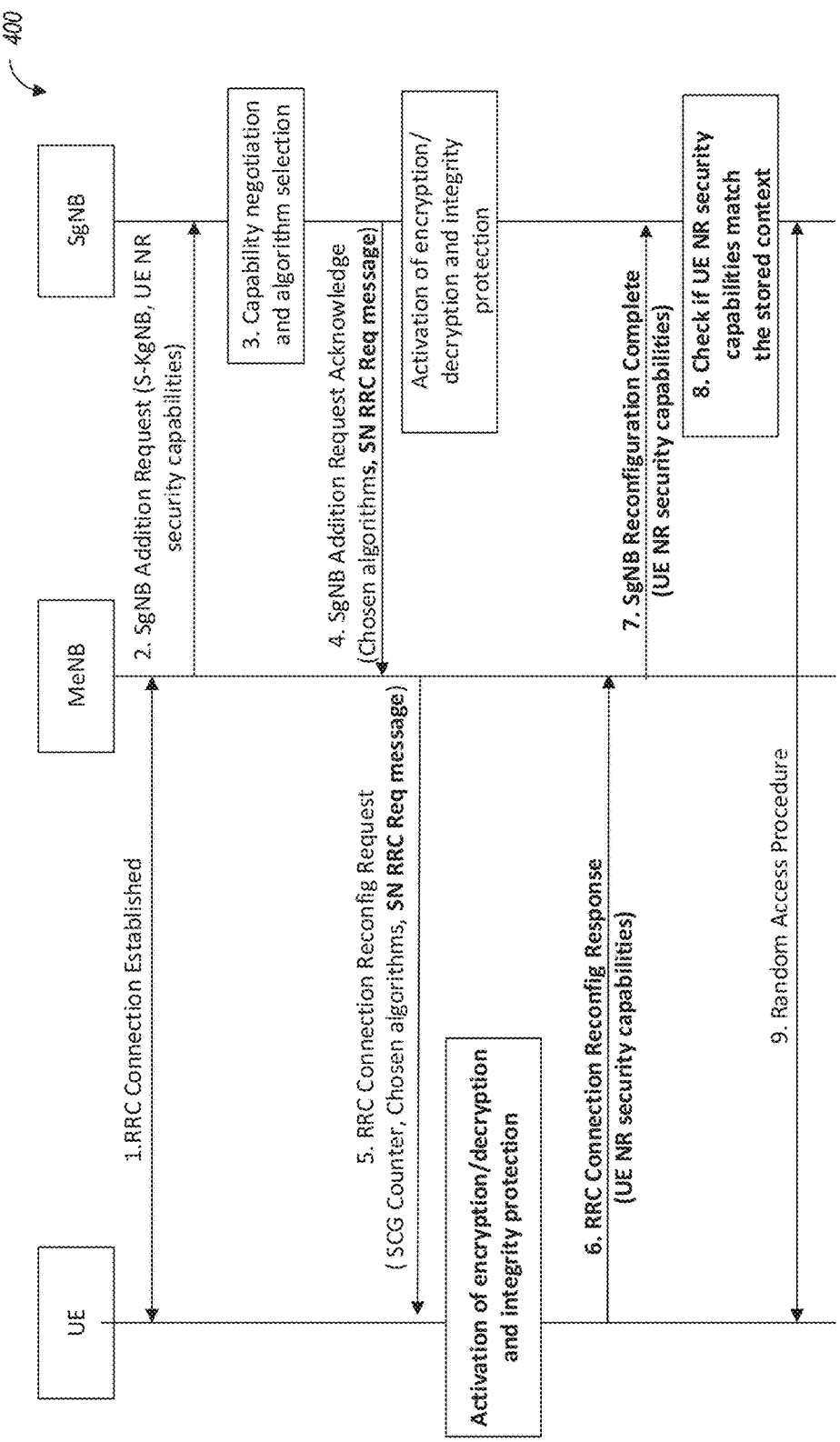
FIG. 4 illustrates renegotiation of UE NR security capabilities via SN RRC request message forwarded by MeNB, in accordance with some aspects.

FIG. 4 illustrates renegotiation of UE NR security capabilities via SN RRC request message forwarded by MeNB, in accordance with some aspects. Referring to FIG. 4, the communication exchange 400 can take place between UE 101, the MeNB 111, and the SgNB 128.

At operation 1, the UE and the MeNB can establish an RRC connection.

At operation 2, the MeNB can check whether the UE has NR capability and is authorized to access NR. In this regard, the MeNB sends the SgNB an addition request message over the X2-C interface to negotiate the available resources, configuration, and algorithms at the SgNB. When connected to EPC, the MeNB can indicate to the SgNB that user plane (UP) integrity protection shall not be activated. The MeNB can compute and deliver the S-KgNB key to the SgNB if a new key is needed. The UE NR security capabilities are also sent to the SgNB in operation 2.

At operation 3, the SgNB allocates the necessary resources and selects the ciphering algorithm for the data radio bearers (DRBs) and a signaling radio bearer (SRB) used during dual connectivity communications and selects and integrity algorithm if an SRB is to be established which is the highest priority from his configured list and is also present in the UE NR security capabilities. If a new S-KgNB was delivered to the SgNB, then the SgNB calculates additional keys for use by the SgNB to encrypt or integrity protect user plane and control plane communications.

At operation 4, the SgNB sends the MeNB an addition request acknowledge message indicating the availability of requested resources and the identifiers for the selected algorithms to serve the requested DRBs and/or SRB for the UE. In some aspects, the SgNB may include an indication for renegotiation of UE NR security capability in an encapsulated SN RRC Request message sent to MeNB in SgNB Addition Request Acknowledge message during operation 4. The SgNB Addition Request Acknowledge message may be integrity protected using an S-KgNB_RRCint key.

At operation 5, the MeNB sends an RRC connection reconfiguration request message to the UE, instructing the UE to configure the new DRBs and/or SRBs for the SgNB. The MeNB can include the SCG counter parameter to indicate that the UE computes the S-KgNB for the SgNB if a new key is needed. The MeNB forwards the UE configuration parameters, which can include the algorithm identifiers received from the SgNB in operation 4. The communication between the MeNB and the UE during this operation can be integrity protected using an RRC integrity protection key of the MeNB. In some aspects, the RRC Connection Reconfiguration Request message includes the encapsulated SN RRC Request message, where the encapsulated SN RRC Request message may be integrity protected using the S-KgNB_RRCint key.

At operation 6, if the indication for renegotiation of UE NR security capability is included in the SN RRC request message, the UE may include at least one of the following information in a response message: the UE NR security capabilities (e.g., as configured and stored by the UE) and an NR-DC token. This information can be communicated via an SN RRC Response message, which is protected with S-KgNB_RRCint and S-KgNB_RRCenc keys. The SN RRC Response message is encapsulated in the RRC Connection Reconfiguration Response message sent to MeNB in operation 6.

At operation 7, the MeNB forwards the encapsulated SN RRC Response message to the SgNB in the SgNB Reconfiguration Complete message. If the SgNB does not receive UE NR security capabilities in the SN RRC response message, the SgNB may deactivate the dual connectivity. If the SgNB receives the UE NR security capabilities, the SgNB checks (in operation 8) if the UE NR capabilities match the UE NR security capabilities received by the SgNB in operation 2. If there is no match, the SgNB deactivates the DC and rejects the Random access procedure from the UE. If the SgNB receives the NR-DC token, the SgNB can use it as an input to generate a new *S-KgNB derivation key (e.g., as illustrated in connection with FIG. 7 or FIG. 8).

The above techniques disclosed in connection with FIG. 4 can be performed when the supported and selected UE NR security algorithms are different from UE EPS security algorithms. Otherwise, the techniques disclosed in connection with FIG. 4 may not be able to resolve the bidding down issue completely because the MeNB may still be able to tamper with the encapsulated SN RRC message including information of UE NR security capabilities using information of S-KgNB, chosen algorithm, UE NR capabilities, and SCG counter.

Figure 5:
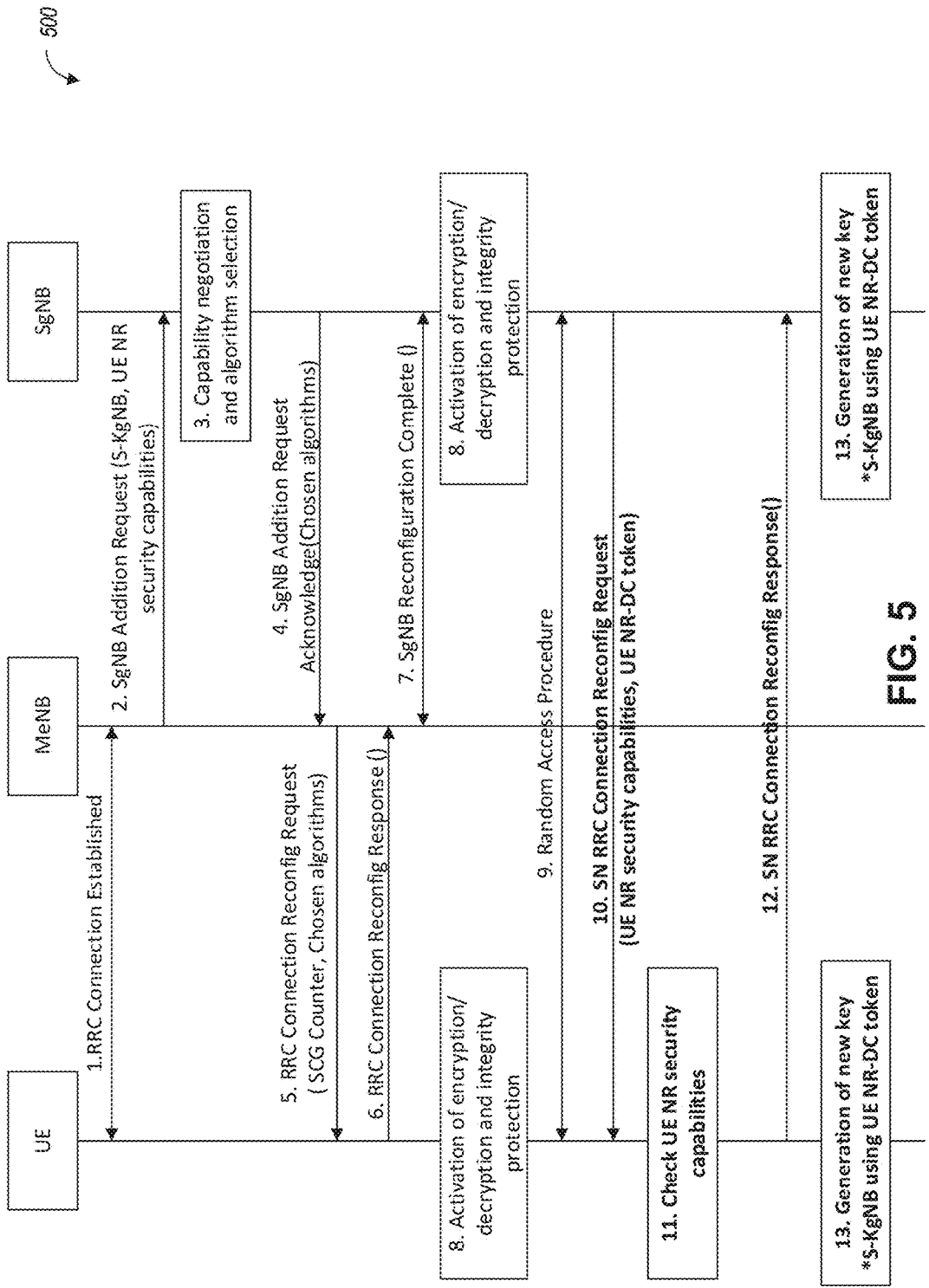
FIG. 5 illustrates renegotiation of UE NR security capabilities via configured SRB3 for RRC connection reconfiguration request message sent directly by the SgNB to the UE, in accordance with some aspects.

FIG. 5 illustrates renegotiation of UE NR security capabilities via configured SRB3 for RRC connection reconfiguration request message sent directly by the SgNB to the UE, in accordance with some aspects. Referring to FIG. 5, the communication exchange 500 can take place between UE 101, the MeNB 111, and the SgNB 128.

Operations 1-9 may be the same as operations 1-9 discussed in connection with FIG. 2A. Additionally, the SgNB allocates radio resources and configures (with MeNB assistance) SRB3 for RRC messages. Also, the SgNB and the UE generate S-KgNB_RRCint and S-KgNB_RRCenc keys, which can be used for security protection of SN RRC messages sent via the MeNB or the SgNB.

In operation 10, the SgNB generates a random number as a NR-DC token and sends the following information via the SN RRC Connection Reconfiguration Request message using SRB3 (the RRC message can be protected by S-KgNB_RRCinc and S-KgNB_RRCenc keys): the UE NR security capabilities as received by the SgNB in operation 2 and the UE NR-DC token.

In operation 11, the UE can checks the UE NR security capabilities received in operation 10 against the UE NR security capabilities stored by the UE.

In operation 12, the UE sends SN RRC connection Reconfiguration Response message to the SgNB via SRB3. If the UE NR security capabilities received in operation 10 does not match the UE NR security capabilities stored by the UE, the UE can indicate the mismatch to the SgNB in the RRC connection response message.

If the SgNB receives an RRC connection reconfiguration response message indicating a mismatch, the SgNB can terminate the dual connectivity. If the RRC connection reconfiguration response message indicates a match of the UE NR security capabilities stored by the UE and received by the UE in operation 10, the processing continues with operation 13.

Figure 7:
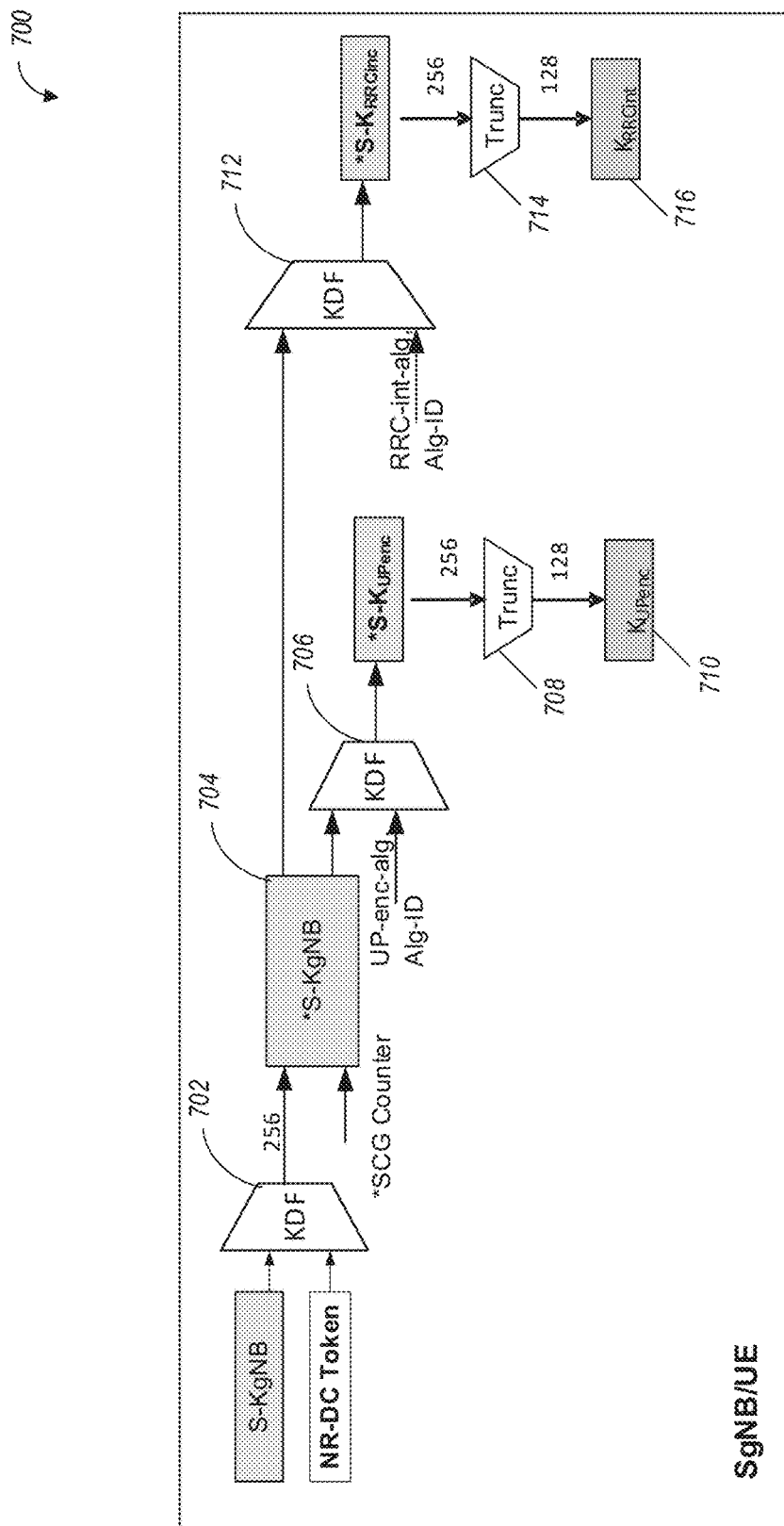
FIG. 7 illustrates SgNB and UE security key derivation technique for protecting user plane and control plane traffic, in accordance with some aspects.

In operation 13, the UE and the SgNB can use the NR-DC token, SCG Counter, and S-KgNB as inputs to generate a new derivation key, *S-KgNB, where the SCG Counter is used as freshness input into the *S-KgNB derivations (as illustrated in FIG. 7). The UE and the SgNB further use the *S-KgNB to generate *S-KgNB_UPenc, *S-KgNB_UPint, *S-KgNB_RRCint, and *S-KgNB_RRCenc encryption and integrity protection keys for securing user plane and control plane communications.

Figure 6:
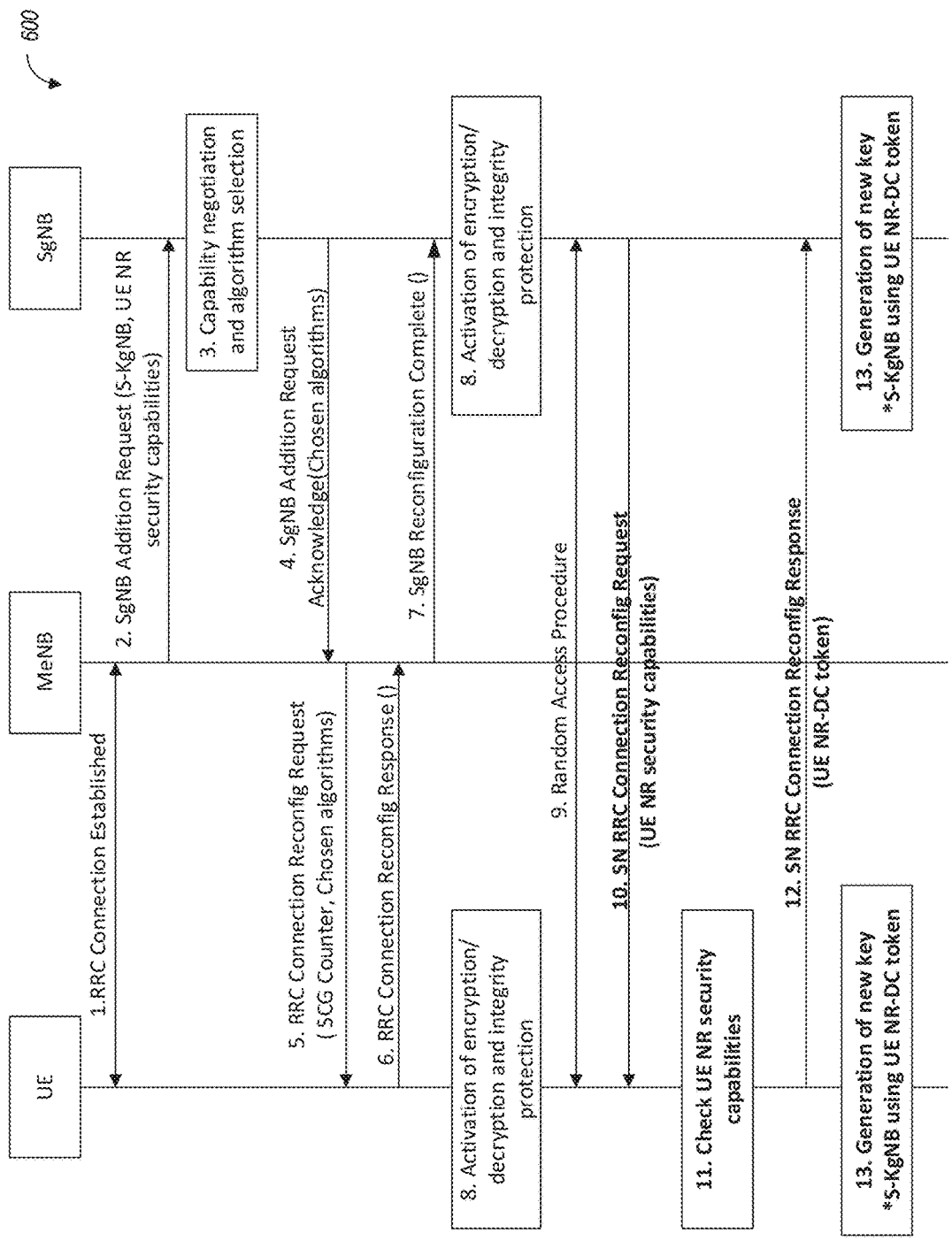
FIG. 6 illustrates renegotiation of UE NR security capabilities via configured SRB3 for RRC connection reconfiguration response message sent directly by the UE to the SgNB, in accordance with some aspects.

FIG. 6 illustrates renegotiation of UE NR security capabilities via configured SRB3 for RRC connection reconfiguration response message sent directly by the UE to the SgNB, in accordance with some aspects. Referring to FIG. 6, the communication exchange 600 can take place between UE 101, the MeNB 111, and the SgNB 128.

Operations 1-9 may be the same as operations 1-9 discussed in connection with FIG. 2A. Additionally, the SgNB allocates radio resources and configures (with MeNB assistance) SRB3 for RRC messages. The SgNB and the UE generate S-KgNB_RRCint and S-KgNB_RRCenc keys, which can be used for security protection of SN RRC messages sent via the MeNB or the SgNB.

In operation 10, the SgNB sends the following information via the SN RRC Connection Reconfiguration Request message using SRB3 (the RRC message can be protected by S-KgNB_RRCinc and S-KgNB_RRCenc keys): the UE NR security capabilities as received by the SgNB in operation 2.

In operation 11, the UE can checks the UE NR security capabilities received in operation 10 against the UE NR security capabilities stored by the UE.

In operation 12, the UE sends SN RRC connection Reconfiguration Response message to the SgNB via SRB3, which message includes a UE NR-DC token generated by the UE. If the UE NR security capabilities received in operation 10 does not match the UE NR security capabilities stored by the UE, the UE can indicate the mismatch to the SgNB in the RRC connection response message. The RRC connection reconfiguration response message can be protected by S-KgNB_RRCinc and S-KgNB_RRCenc keys.

If the SgNB receives the RRC connection reconfiguration response message indicating a mismatch, the SgNB can terminate the dual connectivity. If the RRC connection reconfiguration response message indicates a match of the UE NR security capabilities stored by the UE and received by the UE in operation 10, the processing continues with operation 13.

In operation 13, the UE and the SgNB can use the NR-DC token, SCG Counter, and S-KgNB as inputs to generate a new derivation key, *S-KgNB, where the SCG Counter is used as freshness input into the *S-KgNB derivations (as illustrated in FIG. 7). The UE and the SgNB further use the *S-KgNB to generate *S-KgNB_UPenc, *S-KgNB_UPint, *S-KgNB_RRCint, and *S-KgNB_RRCenc encryption and integrity protection keys for securing user plane and control plane communications.

FIG. 7 illustrates SgNB and UE security key derivation technique 700 for protecting user plane and control plane traffic, in accordance with some aspects. Referring to FIG. 7, the security key derivation technique 700 uses the S-KgNB key and the NR-DC token as inputs into the key derivation function (KDF) 702. A new derivation key *S-KgNB 704 is generated by the KDF 702 and further using the SCG counter as illustrated in FIG. 7. The new derivation key *S-KgNB 704 is communicated to KDFs 706 and 712. KDF 706 uses key 704 together with user plane encoding algorithm ID as inputs to generate user plane encoding derivation key *S-KUPenc, which is truncated by function 708 to generate user plane encoding key KUPenc 710. KDF 712 uses key 704 together with RRC integrity protection algorithm ID as inputs to generate RRC integrity protection derivation key *S-KRRCint, which is truncated by function 714 to generate RRC integrity protection key KRRCint 716.

The above techniques disclosed in FIG. 7 can be used in connection with the communication exchange disclosed in FIG. 4, FIG. 5, and FIG. 6 that use an NR-DC token. Referring to FIG. 7, when the SgNB confirms the UE NR security capabilities and generates a new security key *S-KgNB, it sends an SgNB modification message with an indication to the MeNB or MgNB over Xx or Xn interfaces. The indication can be for the MeNB or the MgNB to stop key refreshing procedure including stop sending an SCG counter to the UE and stop sending new derivation key (e.g., S-KgNB) to the SgNB.

The SgNB can decide on its own to perform *S-KgNB update by using SRB3 for RRC Connection Reconfiguration Request/Response messages for delivering SCG counter parameters, and deriving new security key *S-KgNB, where the SCG counter is maintained by the SgNB and is used when computing the *S-KgNB (as illustrated in FIG. 7).

In some aspects, the SgNB sets the SCG Counter to '0' when deriving the first *S-KgNB using the NR-DC token. The SCG Counter is stored in the associated NR-DC AS security context at the SgNB. The SgNB sets the SCG Counter to '1' after the first calculated *S-KgNB, and monotonically increments it for each additional calculated *S-KgNB. In some aspects, before the SCG Counter wraps around, the SgNB and the UE use a new NR-DC token to refresh *S-KgNB and the SCG Counter is reset to '0'. The UE and the SgNB can treat the SCG Counter as a fresh input to *S-KgNB derivation illustrated in FIG. 7.

Figure 8:
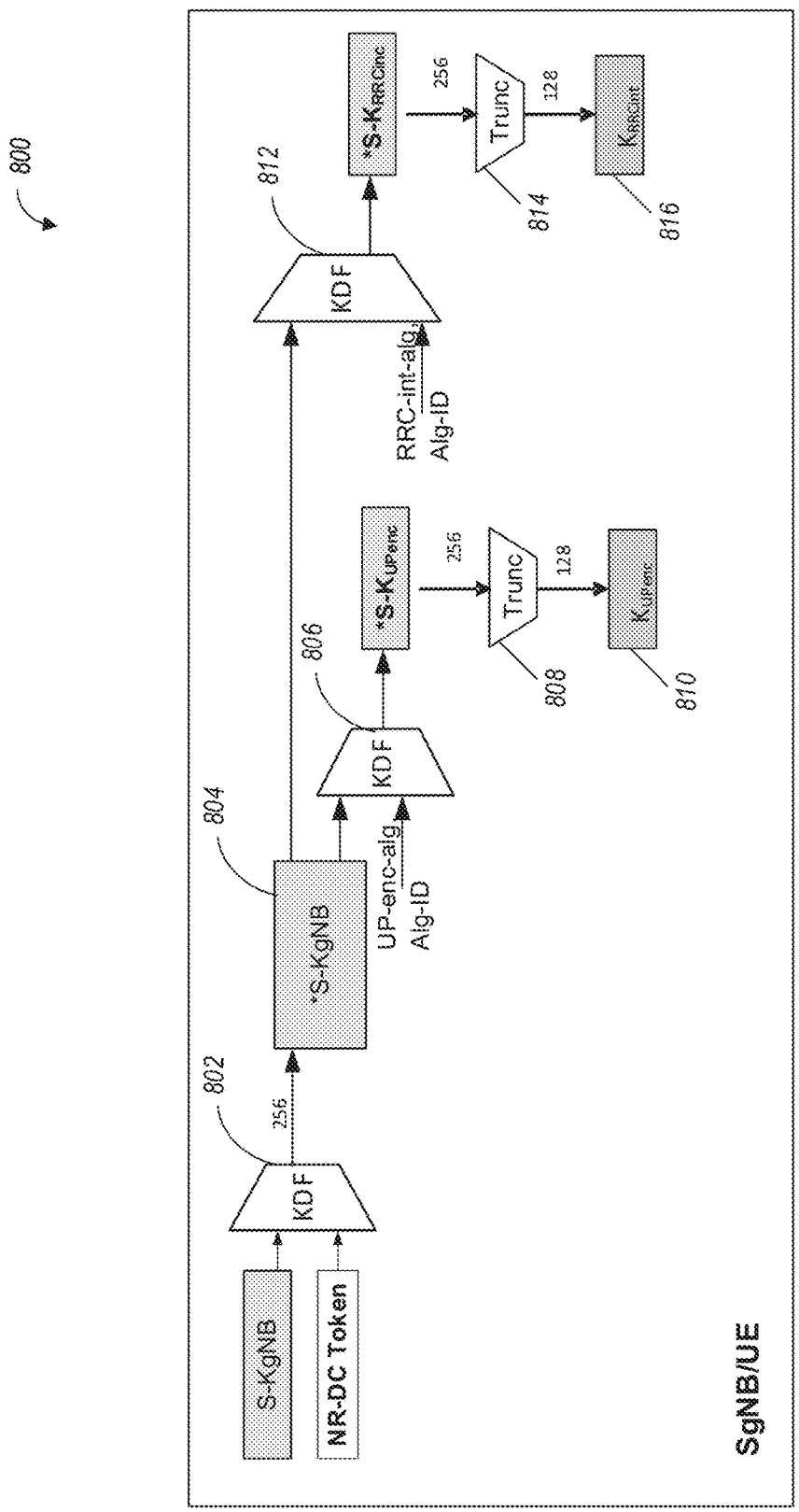
FIG. 8 illustrates another SgNB and UE security key derivation technique for protecting user plane and control plane traffic, in accordance with some aspects.

FIG. 8 illustrates another SgNB and UE security key derivation technique 800 for protecting user plane and control plane traffic, in accordance with some aspects. Referring to FIG. 8, the security key derivation technique 800 uses the S-KgNB key and the NR-DC token as inputs into the key derivation function (KDF) 802. A new derivation key *S-KgNB 804 is generated by the KDF 802. The new derivation key *S-KgNB 804 is communicated to KDFs 806 and 812. KDF 806 uses key 804 together with user plane encoding algorithm ID as inputs to generate user plane encoding derivation key *S-KUPenc, which is truncated by function 808 to generate user plane encoding key KUPenc 810. KDF 812 uses key 804 together with RRC integrity protection algorithm ID as inputs to generate RRC integrity protection derivation key *S-KRRCint, which is truncated by function 814 to generate RRC integrity protection key KRRCint 816.

The above security key refreshment techniques disclosed in FIG. 8 can be used in connection with the communication exchange disclosed in FIG. 4, FIG. 5, and FIG. 6 that use an NR-DC token. Referring to FIG. 8, when the SgNB confirms the UE NR security capabilities and generates a new security key *S-KgNB 804, it sends an SgNB modification message with an indication to the MeNB or MgNB over Xx or Xn interface. The indication can be for the MeNB or the MgNB to stop key refreshing procedure including stop sending an SCG counter to the UE and stop sending new a derivation key (e.g., S-KgNB) to the SgNB. The SgNB decides on its own to perform *S-KgNB update by using SRB3 for RRC Connection Reconfiguration Request/Response messages for renewing the NR-DC token and deriving a new security key *S-KgNB as illustrated in FIG. 8.

In some aspects, a first RAN node can initiate dual connectivity with a second RAN node, where the first RAN node generates a first security key (e.g., S-KgNB) for the secondary RAN node and transmits it to the secondary RAN node. The first RAN node configures a signaling radio bearer for an RRC message, where based on the first RAN node generating a first security key of a secondary RAN node, the second RAN node and a UE generate a pair of security keys for security protection of the RRC messages sent by a second RAN node, including an RRC message integrity security key and an RRC message encryption security key of the second RAN node, i.e., S-KgNB_RRCint and S-KgNB_RRCenc keys. The second RAN node can send NR RRC Connection Reconfiguration Request message including the information of UE NR security capabilities directly to the UE, and the RRC message is protected by S-KgNB_RRCenc and S-KgNB_RRCint keys. The UE checks the UE NR security capabilities. The UE further generates the UE NR-DC token and sends the token via the SN RRC Reconfiguration Response message towards the second RAN node, and the RRC message is integrity/confidentiality protected by S-KgNB_RRCint and S-KgNB_RRCenc keys. The second RAN node uses the NR-DC token, SCG Counter, and S-KgNB as inputs to generate a new key as a secondary security key for the secondary RAN node (e.g., the *S-KgNB key), where the SCG Counter is used as freshness input into the *S-KgNB derivations. The UE and the secondary RAN node further use *S-KgNB to generate a new pairs of security keys for an RRC message integrity security key and an RRC message encryption security key of the second RAN node, i.e., S-KgNB_RRCint and S-KgNB_RRCenc, and user plane traffic integrity security key and encryption key, *S-KgNB_UPenc, *S-KgNB_UPint keys.

In some aspects, the secondary RAN node confirms the UE NR security capabilities and generates a new security key for the secondary RAN node, *S-KgNB, and it sends an SgNB modification message with an indication to the first RAN node (e.g., MeNB or MgNB) over Xx or Xn interfaces. The indication is to stop key refreshing procedure including stop sending SCG counter to the UE and stop sending new derivation key to the SgNB. The secondary RAN node decides on its own to perform *S-KgNB update by using SRB3 for RRC Connection Reconfiguration Request/Response messages for delivering SCG counter parameters and deriving new security key *S-KgNB, where the SCG counter is to maintained by the SgNB and used when computing the *S-KgNB. In some aspects, the secondary RAN node, SgNB, sets the SCG Counter to '0' when deriving the first *S-KgNB using the NR-DC token by using the stored SCG Counter in the associated NR-DC AS security context at the secondary RAN node. The secondary RAN node sets the SCG Counter to '1' after the first calculated *S-KgNB, and monotonically increment it for each additional calculated *S-KgNB. Before the SCG Counter wraps around, the secondary RAN node and the UE use a new NR-DC token to refresh *S-KgNB and the SCG Counter is reset to '0'. The UE and the secondary RAN node treat the SCG Counter as a fresh input to *S-KgNB derivation.

In some aspects, when the secondary RAN node, e.g. SgNB or SeNB, confirms the UE NR security capabilities and generates a new security key *S-KgNB, it sends an SgNB modification message with an indication to the first RAN node, e.g., MeNB or MgNB, over Xx or Xn interface. The indication can be to stop key refreshing procedure including stop sending SCG counter to the UE, stop sending new derivation key to the SgNB. The secondary RAN node decides on its own to perform *S-KgNB update by using SRB3 for RRC Connection Reconfiguration Request/Response messages for renewing NR-DC token and deriving new security key *S-KgNB.

Figure 9:
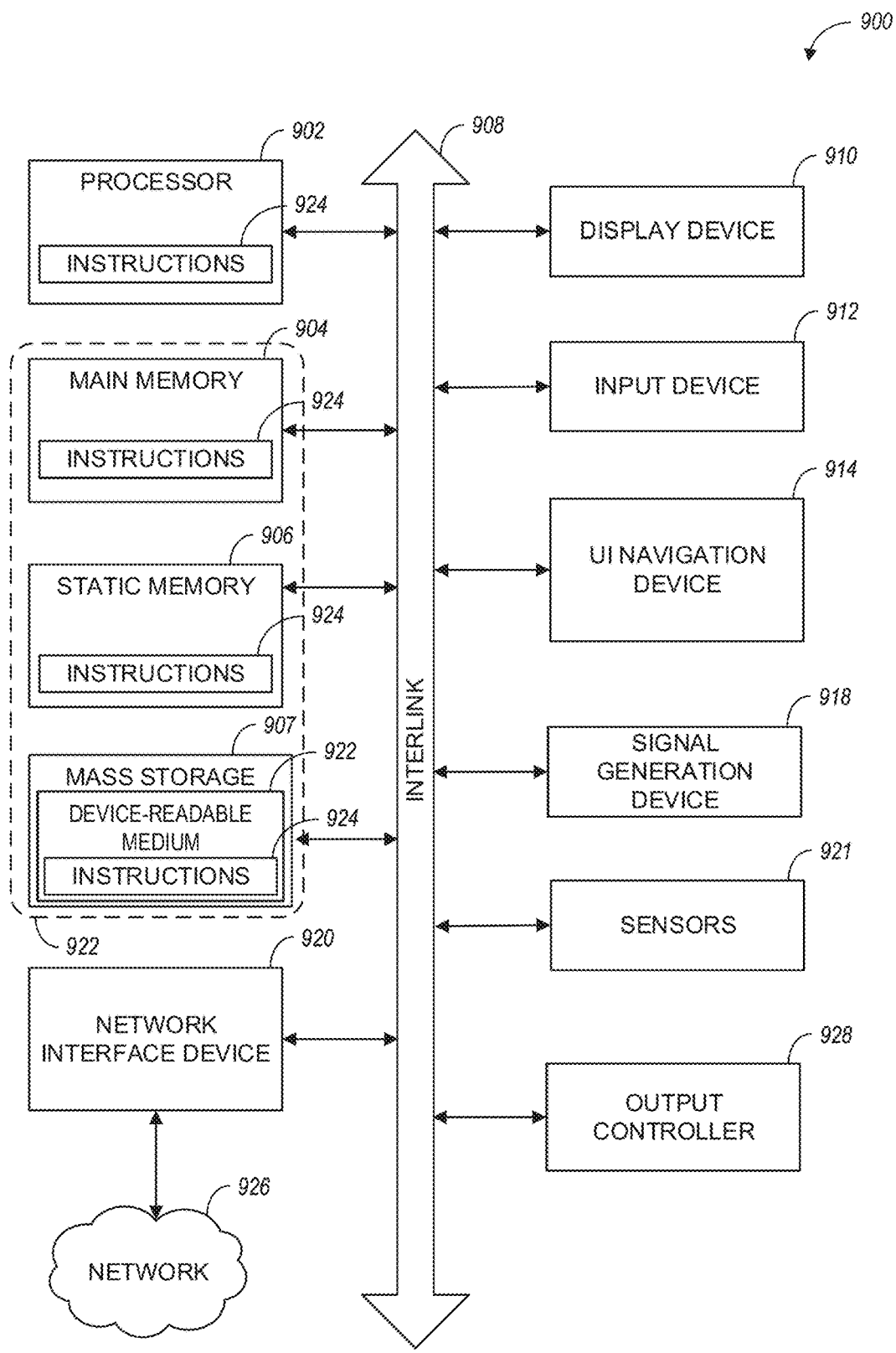
FIG. 9 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 9 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 900 may operate as a standalone device or may be connected (e.g., networked) to other communication devices.

Circuitry (e.g., processing circuitry) is a collection of circuits implemented intangible entities of the device 900 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 900 follow.

In some aspects, the device 900 may operate as a stand-alone device or may be connected (e.g., networked) to other devices. In a networked deployment, the communication device 900 may operate in the capacity of a server communication device, a client communication device, or both in server-client network environments. In an example, the communication device 900 may act as a peer communication device in peer-to-peer (P2P) (or other distributed) network environment. The communication device 900 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 900 may include a hardware processor 902 (e.g., a central processing unit (CPU), a graphics processing unit (GPU), a hardware processor core, or any combination thereof), a main memory 904, a static memory 906, and mass storage 907 (e.g., hard drive, tape drive, flash storage, or other block or storage devices), some or all of which may communicate with each other via an interlink (e.g., bus) 908.

The communication device 900 may further include a display device 910, an alphanumeric input device 912 (e.g., a keyboard), and a user interface (UI) navigation device 914 (e.g., a mouse). In an example, the display device 910, input device 912 and UI navigation device 914 may be a touch-screen display. The communication device 900 may additionally include a signal generation device 918 (e.g., a speaker), a network interface device 920, and one or more sensors 921, such as a global positioning system (GPS) sensor, compass, accelerometer, or another sensor. The communication device 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 907 may include a communication device-readable medium 922, on which is stored one or more sets of data structures or instructions 924 (e.g., software) embodying or utilized by any one or more of the techniques or functions described herein. In some aspects, registers of the processor 902, the main memory 904, the static memory 906, and/or the mass storage 907 may be, or include (completely or at least partially), the device-readable medium 922, on which is stored the one or more sets of data structures or instructions 924, embodying or utilized by any one or more of the techniques or functions described herein. In an example, one or any combination of the hardware processor 902, the main memory 904, the static memory 906, or the mass storage 916 may constitute the device-readable medium 922.

As used herein, the term "device-readable medium" is interchangeable with "computer-readable medium" or "machine-readable medium". While the communication device-readable medium 922 is illustrated as a single medium, the term "communication device-readable medium" may include a single medium or multiple media (e.g., a centralized or distributed database, and/or associated caches and servers) configured to store the one or more instructions 924.

The term "communication device-readable medium" may include any medium that is capable of storing, encoding, or carrying instructions (e.g., instructions 924) for execution by the communication device 900 and that cause the communication device 900 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 924 may further be transmitted or received over a communications network 926 using a transmission medium via the network interface device 920 utilizing any one of a number of transfer protocols. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input-multiple-output (SIMO), MIMO, or multiple-input-single-output (MISO) techniques. In some examples, the network interface device 920 may wirelessly communicate using Multiple User MIMO techniques.

The term "transmission medium" shall be taken to include any intangible medium that is capable of storing, encoding or carrying instructions for execution by the communication device 900, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus of a user equipment (UE), the apparatus comprising:
   processing circuitry, wherein to configure the UE for communication within a dual connectivity (DC) architecture with a Master Node-B (MN) and a Secondary Node-B (SN), the processing circuitry is to:
   decode connection reconfiguration information received from the MN, the connection reconfiguration information including signaling radio bearer type 3 (SRB3) configuration information, the SRB3 configuration information originating from the SN and configuring a SRB3, the SRB3 for a radio resource control (RRC) connection between the UE and the SN;
   decode an RRC connection reconfiguration request message received from the SN via the SRB3, the RRC connection reconfiguration request message including UE new radio (NR) security capability information of the SN; and
   determine whether the UE NR security capability information received from the SN matches UE NR security capability information received by the UE from the MN; and memory coupled to the processing circuitry, the memory configured to store the SRB3 configuration information.

2. The apparatus of claim 1, wherein the processing circuitry is to:
   based on detecting a match between the UE NR security capability information received from the SN and the UE NR security capability information received by the UE from the MN, generate a derivation security key using a UE NR-DC token within the RRC connection reconfiguration request message, the derivation security key for securing user plane communication between the UE and the SN and control plane signaling communication between the UE and the SN.

3. The apparatus of claim 1, wherein the processing circuitry is to:
   upon detecting a mismatch between the UE NR security capability information received from the SN and the UE NR security capability information stored at the UE, encode a RRC connection reconfiguration response message for transmission to the SN via the SRB3, the RRC connection reconfiguration response message including an indication of a cause for the mismatch.

4. The apparatus of claim 1, wherein the RRC connection reconfiguration request message for transmission to the SN via the SRB3 includes a UE NR-DC token generated by the SN based on detecting a match between the UE NR security capability information received from the SN and the UE NR security capability information received by the UE from the MN, and the processing circuitry is to generate the derivation security key using the UE NR-DC token.

5. The apparatus of claim 1, wherein the RRC connection reconfiguration response message for transmission to the SN via the SRB3 includes a UE NR-DC token generated by the UE based on detecting a match between the UE NR security capability information received from the SN and the UE NR security capability information received by the UE from the MN, and the processing circuitry is to generate the derivation security key using the UE NR-DC token.

6. The apparatus of claim 1, wherein the derivation security key is a *K-SgNB key, and wherein the processing circuitry is to:
   generate user plane security keys for securing the user plane communication and control plane security keys for securing the control plane signaling communication between the UE and the SN using the *K-SgNB derivation security key.

7. The apparatus of claim 6, wherein:
   the user plane security keys include a KUPenc key for encrypting the user plane communication and a KUPint key for integrity protecting the user plane communication; and
   the control plane security keys include a KRRCenc key for encrypting the control plane communication and a KRRCint key for integrity protecting the control plane communication.

8. The apparatus of claim 7, wherein the UE receives a second RRC connection reconfiguration request message from the SN which further includes secondary cell group (SCG) counter parameters generated by the SN, and the processing circuitry is to:
   determine a SCG counter value based on the SCG counter parameters; and
   generate a second derivation security key, based on the SCG counter value, to re-generate a second pair of security keys for securing the user plane communication between the UE and the SN and the control plane signaling communication between the UE and the SN.

9. The apparatus of claim 1, further comprising transceiver circuitry coupled to the processing circuitry; and, one or more antennas coupled to the transceiver circuitry.

10. The apparatus of claim 1, wherein the DC architecture is an Evolved Universal Terrestrial Radio Access (E-UTRA) Next Generation Dual Connectivity (EN-DC) architecture, the MN is a Master Evolved Node-B (MeNB), and the SN is a Secondary Next Generation Node-B (SgNB).

11. An apparatus of a Secondary Node-B (SN), the apparatus comprising:
processing circuitry, wherein to configure the apparatus for Dual Connectivity (DC) with a User Equipment (UE) and a Master Node-B (MN), the processing circuitry is to:
decode a DC configuration message from the MN, the DC configuration message including first UE new radio (NR) security capabilities information for the UE;
encode an indication for renegotiation of UE NR security capabilities in an encapsulated SN radio resource control (RRC) request message for transmission to the UE via the MN;
decode a SN RRC response message in response to the SN RRC request message, the SN RRC response message originating from the UE and received via a SN RRC reconfiguration complete message from the MN, the SN RRC response message including second UE NR security capabilities information;
perform UE NR security capabilities verification based on the first and second UE NR security capability information; and
perform a random-access procedure initiated by the UE based on a result of the UE NR security capabilities verification.

12. The apparatus of claim 11, wherein to perform the UE NR security capabilities verification, the processing circuitry is to:
determine whether the first UE NR security capability information matches the second UE NR security capability information.

13. The apparatus of claim 12, wherein the processing circuitry is to:
perform the random-access procedure initiated by the UE upon detecting a match between the first UE NR security capability information and the second UE NR security capability information.

14. The apparatus of claim 12, wherein the processing circuitry is to:
deactivate DC with the MN upon detecting a mis-match between the first UE NR security capability information and the second UE NR security capability information.

15. The apparatus of claim 11, wherein the SN RRC response message further includes a new radio (NR)-DC token, and the processing circuitry is further to:
generate using the NR-DC token, a new derivation security key for encrypting user plane data communication and control plane RRC signaling communication between the UE and the SN within the DC architecture.

16. A non-transitory computer-readable storage medium that stores instructions for execution by one or more processors of a user equipment (UE) within a dual connectivity (DC) architecture with a Master Node-B (MN) and a Secondary Node-B (SN), the instructions to configure the one or more processors to cause the UE to:
decode connection reconfiguration information received from the MN, the connection reconfiguration information including signaling radio bearer type 3 (SRB3) configuration information, the SRB3 configuration information originating from the SN and configuring a SRB3, the SRB3 for a radio resource control (RRC) connection between the UE and the SN;
decode an RRC connection reconfiguration request message received from the SN via the SRB3, the RRC connection reconfiguration request message including UE new radio (NR) security capability information of the SN; and
determine whether the UE NR security capability information received from the SN matches UE NR security capability information received by the UE from the MN.

17. The non-transitory computer-readable storage medium of claim 16, wherein the instructions configure the one or more processors to cause the UE to:
based on detecting a match between the UE NR security capability information received from the SN and the UE NR security capability information received by the UE from the MN, generate a derivation security key using a UE NR-DC token within the RRC connection reconfiguration request message, the derivation security key for securing user plane communication between the UE and the SN and control plane signaling communication between the UE and the SN.

18. The non-transitory computer-readable storage medium of claim 16, wherein the instructions configure the one or more processors to cause the UE to:
upon detecting a mismatch between the UE NR security capability information received from the SN and the UE NR security capability information stored at the UE, encode a RRC connection reconfiguration response message for transmission to the SN via the SRB3, the RRC connection reconfiguration response message including an indication of a cause for the mismatch.

19. The non-transitory computer-readable storage medium of claim 16, wherein the RRC connection reconfiguration request message for transmission to the SN via the SRB3 includes a UE NR-DC token generated by the SN based on detecting a match between the UE NR security capability information received from the SN and the UE NR security capability information received by the UE from the MN, and wherein the instructions configure the one or more processors to cause the UE to generate the derivation security key using the UE NR-DC token.

20. The non-transitory computer-readable storage medium of claim 16, wherein the RRC connection reconfiguration response message for transmission to the SN via the SRB3 includes a UE NR-DC token generated by the UE based on detecting a match between the UE NR security capability information received from the SN and the UE NR security capability information received by the UE from the MN, and wherein the instructions configure the one or more processors to cause the UE to generate the derivation security key using the UE NR-DC token.

* * * * *